(12) United States Patent
Sadil

(10) Patent No.: US 7,207,352 B2
(45) Date of Patent: Apr. 24, 2007

(54) BUSHING FOR THERMALLY INDEPENDENT BYPASS AIR METERING VALVE

(75) Inventor: Andreas Sadil, Newington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/120,700

(22) Filed: May 2, 2005

(65) Prior Publication Data

US 2006/0243333 A1 Nov. 2, 2006

(51) Int. Cl.
*F16K 3/04* (2006.01)

(52) U.S. Cl. .................................. 137/625.31

(58) Field of Classification Search ........... 137/625.31; 251/121, 328, 365; 60/771
See application file for complete search history.

(56) References Cited

U.S. PATENT DOCUMENTS

| | | | | |
|---|---|---|---|---|
| 1,986,252 A * | 1/1935 | Conran | ....................... | 137/383 |
| 2,978,221 A * | 4/1961 | Pool | ............................ | 251/172 |
| 3,135,293 A * | 6/1964 | Hulsey | ................... | 137/625.31 |
| 4,516,606 A * | 5/1985 | Worley | .................... | 137/625.3 |
| 4,953,595 A * | 9/1990 | Kotlyar | ................. | 137/624.13 |
| 5,246,035 A * | 9/1993 | Skyllingstad et al. | .. | 137/625.31 |
| 6,085,787 A * | 7/2000 | Kivipelto | ............... | 137/625.32 |
| 6,688,321 B2 * | 2/2004 | Palmer | .................... | 137/15.19 |
| 6,805,165 B2 * | 10/2004 | Lin | ............................ | 137/893 |

* cited by examiner

*Primary Examiner*—John Fox
(74) *Attorney, Agent, or Firm*—Bachman & LaPointe

(57) ABSTRACT

A bypass air metering valve is provided with a stationary case flange having a plurality of slots, a bushing positioned within each of the slots, and a metering ring positioned so as to ride on a surface of each respective bushing. Each bushing creates a gap between the stationary case flange and the metering ring. Each bushing has an internal opening which is sized to create an open area flow for cooling or operating the nozzle and its attaching flap hardware. The metering ring covers and uncovers the internal opening of each bushing as required by the engine operating schedule.

18 Claims, 3 Drawing Sheets

BUSHING FOR THERMALLY INDEPENDENT BYPASS AIR METERING VALVE

STATEMENT OF GOVERNMENT INTEREST

The Government of the United States of America may have rights in the present invention as a result of Contract No. N00019-02-C-3003 awarded by the Department of the Navy.

BACKGROUND OF THE INVENTION (1) Field of the Invention

The present invention relates to a bushing to be used in a metering valve used to supply cooling air to a nozzle of a gas turbine engine.

(2) Prior Art

It is known in the prior art to provide a valve assembly to supply cooling air to a nozzle movable between a conventional take-off and landing configuration and a short take-off and vertical landing configuration. One such engine having a movable nozzle and valve assembly for supplying cooling air to the nozzle is shown in U.S. Pat. No. 6,694,723 to Ward, owned by the assignee of the present application.

There remains a need for a valve assembly which has improved performance.

SUMMARY OF THE INVENTION

A bypass air metering valve broadly comprises a stationary case flange having a slot, a metering ring for metering the flow through the valve, and a bushing positioned within the slot so that the metering ring rides on a surface of the bushing.

Other details of the bushing for thermally independent bypass air metering valve, as well as other objects and advantages attendant thereto, are set forth in the following detailed description and the accompanying drawings.

DETAILED DESCRIPTION OF THE PREFERRED EMBODIMENT(S)

Figure 1:
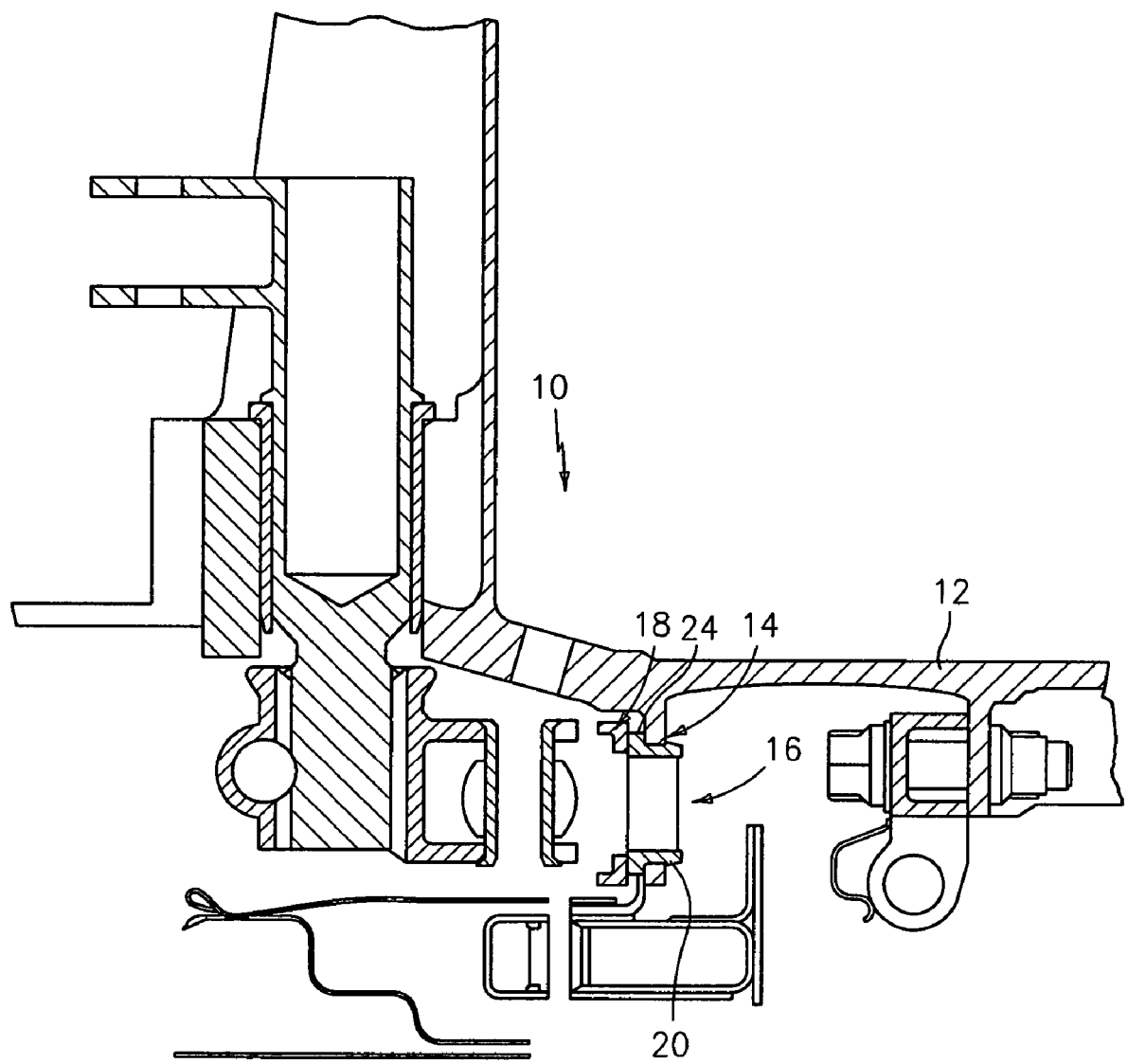
FIG. 1 is a schematic representation of a portion of a bypass air metering valve incorporating a bushing.

Referring now to the drawings, there is shown in FIG. 1 a portion of a bypass metering valve 10. The valve 10 includes a casing 12 having a stationary case flange 14 in which a plurality of slots 16 are located. While the slots 16 may have any desired shape, typically they are oval shaped. The valve 10 further includes a metering ring 18 which moves between an open position (see FIG. 3) and a closed position (see FIG. 4). Any suitable means known in the art may be used to move the metering ring 18 between its open and closed positions.

The valve 10 further includes a plurality of bushings 20 which are positioned within the slots 16, preferably by press fitting. One bushing 20 is positioned within each of the slots 16.

Figure 2:
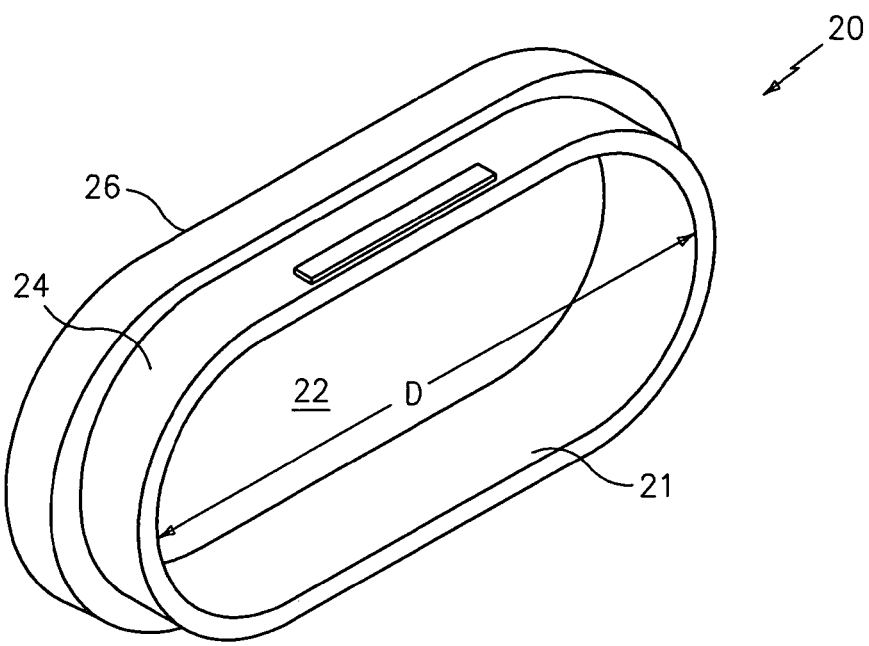
FIG. 2 is a perspective view of the bushing used in the valve of FIG. 1.

As can be seen from FIG. 2, the bushing 20 has a body 21 which circumscribes an internal opening 22. The internal opening 22, preferably has a shape which corresponds to the shape of the slot 16. In a most preferred embodiment of the present invention, the body 21 and the internal opening 22 are both oval shaped.

The bushing 20 further has a raised flange portion 24. The raised flange portion 24 is positioned between the stationary case flange 14 and the movable ring 18. In operation, the metering ring 18 rides on a surface 26 of the raised flange portion 24.

The bushing 20 is preferably formed from a low friction material, such as a Resin/Carbon Fiber braid material or a high temperature thermoset plastic or superimide material.

Figure 3:
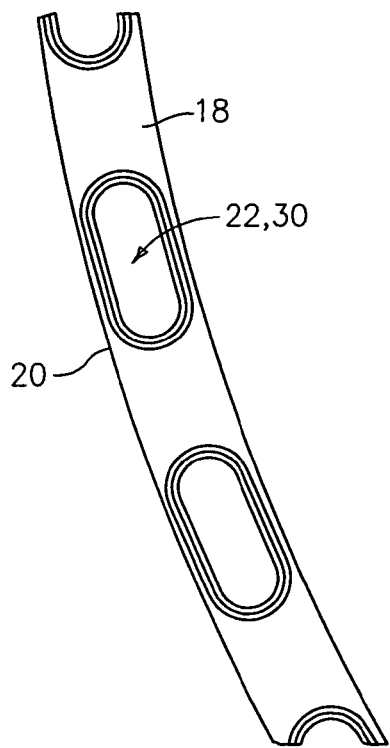
FIG. 3 illustrates the metering ring in an open position.
Figure 4:
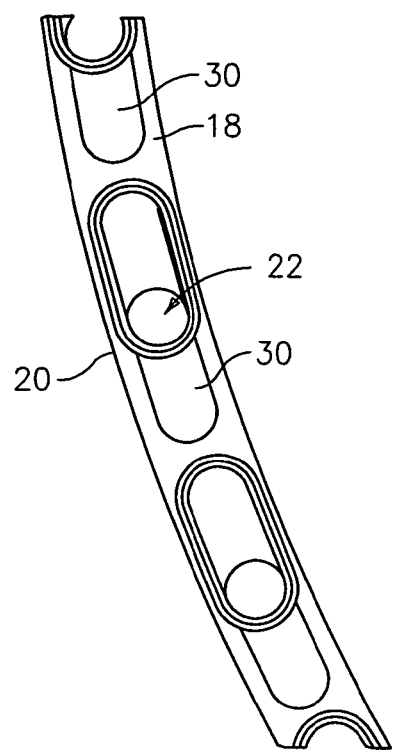
FIG. 4 illustrates the metering ring in a closed position.
Figure 5:
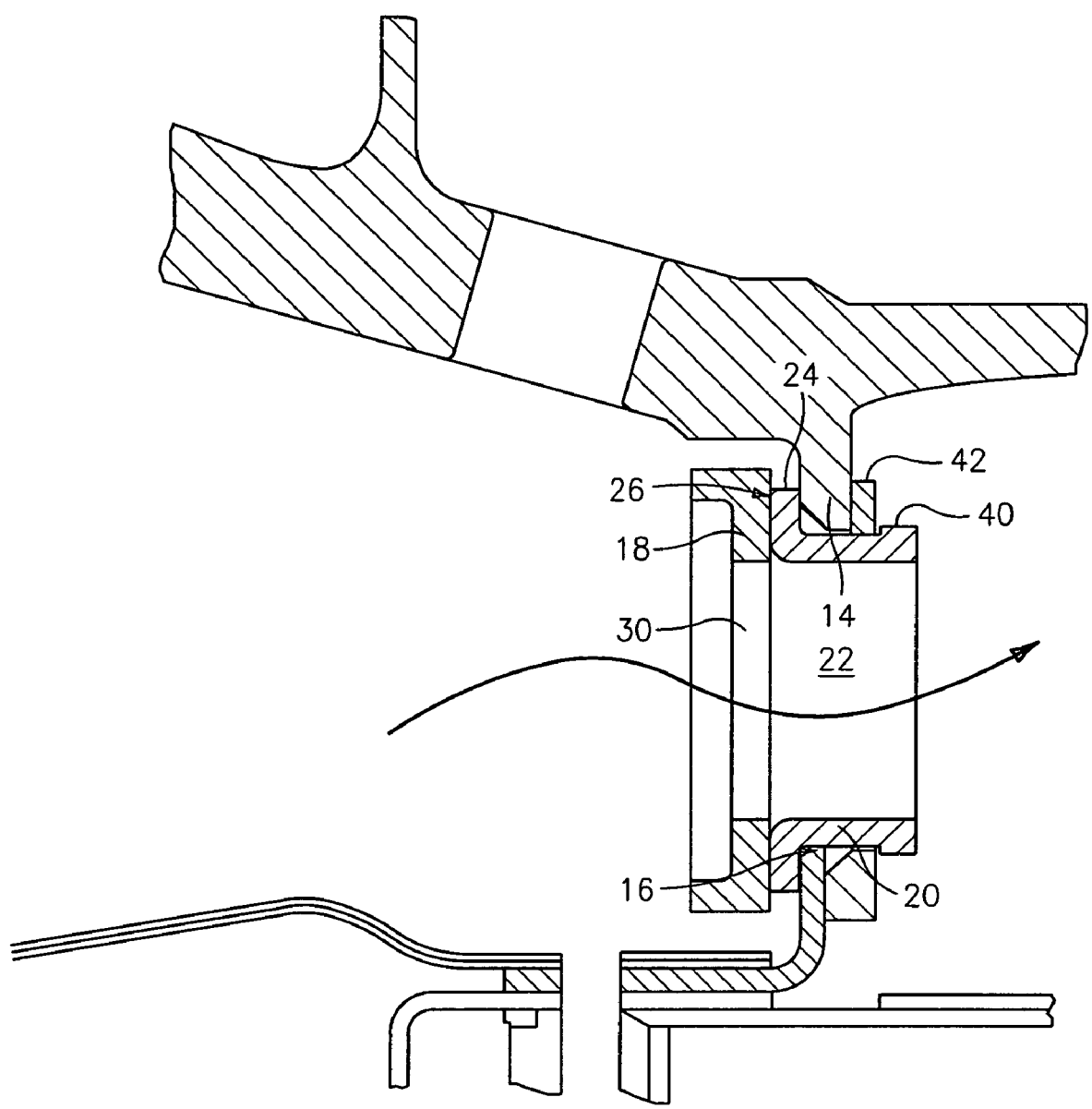
FIG. 5 illustrates the flow of a cooling fluid through a slot in the metering valve of FIG. 1.

Referring now to FIGS. 3 and 4, in operation, the metering ring 18 is provided with a plurality of slots 30 and moves between an open position and a closed position. In the open position (FIG. 3), the metering ring 18 has a respective slot 30 which aligns with the internal opening 22 in the bushing 20 so that the fluid flowing through the internal opening 22 is at its maximum. In the closed position (FIG. 4), the metering ring blocks a portion of the internal opening 22 and the slot 30 overlaps the remaining portion of the internal opening 22, thus reducing the amount of fluid which can flow through the internal opening 22. FIG. 5 illustrates the flow of the fluid through the internal opening 22.

In a preferred embodiment, the metering ring slots 30 are spaced apart by a distance less than the widest dimension D of the internal opening 22. In such an embodiment, the internal opening 22 is never fully closed and is always partially open. Of course, if desired, the metering ring slots 30 may be spaced so as to allow for complete closure of the internal openings 22. Cooling fluid could be bled through other holes elsewhere in the nozzle.

If desired, the bushing 20 may have a rear lip portion 40 which helps position the bushing 20 in the slot 16. The rear lip portion 40 may abut the case flange 14 or may abut a spacer or sheet metal piece 42 positioned between the case flange 14 and the rear lip portion 40. Alternatively, if desired, the spacer or sheet metal piece 42 could be moved to the front side of case flange 14. The spacer or piece 42 could have scallops in it to avoid the bushing 20.

The bushing 20 helps seal the slots or windows 16 and allows upstream cooling fluid, such as air, to get between the metering ring 18 and the case flange 14. The air between the metering ring 18 and the case flange 14 pressure balances the metering ring 18, thus reducing the friction on the surface 26. This also reduces the load required to turn the metering ring 18.

The raised flange portion 24 and the rear lip portion 40 help facilitate the assembly of the bushings 20 into the slots 16. The rear lip portion 40 also provides a last chance containment for the bushing 20 if there is a pressure reversal.

The size of the bushing 20 is determined by the open area flow required to cool or operate the nozzle and its attached flap hardware.

Still another advantage to the bushings is that they allow the metering ring 18 to be mechanically and thermally independent from the static case flange 14, thus enhancing the operation of the metering ring.

It is apparent that there has been provided a bushing for thermally independent bypass air metering valve which fully satisfies the objects, means, and advantages set forth hereinbefore. While the bushing and valve have been described in the context of specific embodiments thereof, other alternatives, modifications, and variations will become apparent to those skilled in the art having read the foregoing description. Accordingly, it is intended to embrace such alternatives, modifications, and variations as fall within the broad scope of the appended claims.

What is claimed is:

1. A metering valve comprising:
a casing having an integral, inwardly projecting stationary flange;
said stationary flange having a plurality of slots;
a metering ring for controlling the amount of a fluid flowing through the slots;
a bushing positioned within each of the flange slots, each said bushing having a first portion with an external surface which contacts an inner surface of the slot in which said bushing is positioned and a raised flange portion attached to said first portion;
said raised flange portion abutting and overlapping a face of said stationary flange perpendicular to said inner surface; and
said metering ring on a surface of said raised flange portion of said bushing.

2. The metering valve according to claim 1, wherein each said slot has a shape and each said bushing has an internal opening corresponding in shape to the shape of the slot.

3. The metering valve according to claim 2, wherein each said slot has an oval shape and each internal opening is oval shaped.

4. The metering valve according to claim 1, wherein each said bushing is press fit into a respective one of said slots.

5. The metering valve according to claim 1, wherein said raised flange portion is located between said rotating metering ring and said case flange.

6. The metering valve according to claim 1, wherein said bushing further has a rear lip portion for securing said bushing in position within said slot.

7. The metering valve according to claim 6, wherein said rear lip portion abuts a surface of said case flange.

8. The metering valve according to claim 6, further comprising a spacer positioned adjacent said case flange and said rear lip portion abutting said spacer.

9. The metering valve according to claim 1, wherein said bushing is formed from a low friction material.

10. The metering valve according to claim 9, wherein said low friction material comprises a material selected from the group consisting of a resin/carbon fiber braid material, a high temperature thermoset plastic material and a superimide material.

11. The metering valve according to claim 1, further comprising:
said metering ring having a plurality of spaced apart slots;
each said bushing having an internal opening; and
said metering ring being movable to a first position where one of said spaced apart slots is aligned with said internal opening.

12. The metering valve according to claim 11, further comprising said metering ring being movable to a second position where a portion of said internal opening is blocked by said metering ring.

13. The metering valve according to claim 11, wherein each of said spaced apart slots and said internal opening is oval shaped.

14. The metering valve according to claim 11, wherein said internal opening has a widest dimension and said slots in said metering ring are spaced apart by a distance less than said widest dimension so that said internal opening is always at least partially open.

15. The metering valve according to claim 1, wherein said bushing creates a gap between said stationary case flange and said metering ring.

16. A metering valve comprising:
a flange having a plurality of slots;
a rotatable metering ring for controlling the amount of a fluid flowing through the slots;
a bushing positioned within each of the flange slots;
each said bushing having a first portion which abuts an inner surface of a respective one of the flange slots and a raised flange portion which abuts and overlaps a face of said flange at an angle to said inner surface;
said metering ring riding on a surface of said raised flange portion; and
each of said slots having a shape and each said bushing having an internal opening corresponding in shape to the shape of the slot.

17. A metering valve comprising:
a flange having a plurality of slots;
a metering ring for controlling the amount of a fluid flowing through the slots;
a bushing positioned within each of the flange slots;
said metering ring riding on a surface of said bushing;
said bushing being formed from a low friction material; and
said low friction material comprising a material selected from the group consisting of a resin/carbon fiber braid material, a high temperature thermoset plastic material and a superimide material.

18. The metering valve according to claim 17, wherein said metering ring rotates, said bushing has a raised flange portion, and said rotating metering ring rides on a surface of said raised flange portion.

* * * * *

UNITED STATES PATENT AND TRADEMARK OFFICE
CERTIFICATE OF CORRECTION

PATENT NO. : 7,207,352 B2
APPLICATION NO. : 11/120700
DATED : April 24, 2007
INVENTOR(S) : Andreas Sadil It is certified that error appears in the above-identified patent and that said Letters Patent is hereby corrected as shown below:

In column 3, claim 1, line 15, "within" should read --with--.

In column 3, claim 1, line 23, "ring" should read --riding--.

Signed and Sealed this

Twenty-seventh Day of November, 2007

JON W. DUDAS
*Director of the United States Patent and Trademark Office*